(12) United States Patent
Atsumi

(10) Patent No.: US 8,919,454 B2
(45) Date of Patent: Dec. 30, 2014

(54) WEEDING DEVICE

(75) Inventor: Kazuya Atsumi, Mitaka (JP)

(73) Assignee: Astumi Real Estate & Corporation, Inc., Tokyo (JP)

( * ) Notice: Subject to any disclaimer, the term of this patent is extended or adjusted under 35 U.S.C. 154(b) by 353 days.

(21) Appl. No.: 13/391,852

(22) PCT Filed: Aug. 15, 2010

(86) PCT No.: PCT/JP2010/063783
§ 371 (c)(1),
(2), (4) Date: Feb. 23, 2012

(87) PCT Pub. No.: WO2011/024660
PCT Pub. Date: Mar. 3, 2011

(65) Prior Publication Data
US 2012/0152572 A1   Jun. 21, 2012

(30) Foreign Application Priority Data
Aug. 31, 2009  (JP) ................................. 2009-200222

(51) Int. Cl.
*A01D 27/00* (2006.01)
*A01B 43/00* (2006.01)
*A01B 45/00* (2006.01)
*A01B 39/18* (2006.01)

(52) U.S. Cl.
CPC ................ *A01B 45/00* (2013.01); *A01B 39/18* (2013.01)
USPC .......................................................... 171/56

(58) Field of Classification Search
USPC .............................................. 171/53–56, 59
See application file for complete search history.

(56) References Cited

U.S. PATENT DOCUMENTS

| | | | | | |
|---|---|---|---|---|---|
| 123,944 | A | * | 2/1872 | Sherwood | 172/107 |
| 885,897 | A | * | 4/1908 | Weeks | 171/56 |
| 1,274,201 | A | * | 7/1918 | Romero | 171/56 |
| 1,292,376 | A | * | 1/1919 | Romero | 171/56 |
| 1,458,441 | A | * | 6/1923 | Rowe | 171/56 |
| 1,590,709 | A | * | 6/1926 | Taylor | 171/56 |

FOREIGN PATENT DOCUMENTS

| | | |
|---|---|---|
| JP | 63167803 | 11/1988 |
| JP | 6046604 | 2/1994 |
| JP | 6-44390 | 6/1994 |
| JP | 644390 | 6/1994 |

(Continued)

OTHER PUBLICATIONS

International Serach Report issued on Oct. 12, 2010, in corresponding International Patent Application No. PCT/JP2010/063783.

*Primary Examiner* — Alicia Torres
(74) *Attorney, Agent, or Firm* — Onello & Mello, LLP

(57) ABSTRACT

A weeding device includes a comb blade unit including first and second comb bodies in which a plurality of comb blades are arranged on a coupling rod in a comb shape. Both ends of a plurality of the comb blade units are fastened on the same circle of the rotating center of a pair of rotating plates. The coupling rod of the first comb body and/or the second comb body is pressed toward the longitudinal direction to project a projection piece to the outside of the rotating plates. The projection piece is depressed by guide plates located on the outside of the rotating plates, and the comb blades are brought into contact with one another or come close to one another to sandwich the blades of grass that are growing therebetween, and that the sandwiched blades are pulled out along with further rotation of the rotating plates.

11 Claims, 7 Drawing Sheets

(56) References Cited

FOREIGN PATENT DOCUMENTS

| JP | 6269201 | 9/1994 |
| JP | 2001120152 | 5/2001 |
| JP | 2003047302 | 2/2003 |
| JP | 2004097041 | 4/2004 |
| JP | 2006129854 | 5/2006 |
| JP | 2008086301 | 4/2008 |

* cited by examiner

WEEDING DEVICE

TECHNICAL FIELD

The present invention relates to a weeding device for pulling out weeds growing in farms and gardens, and in particular, to a device which can also be used as a component of a machine such as a weeder, a harvester, or the like.

BACKGROUND ART

Weeders for pulling out weeds growing in farms and gardens are disclosed in, for example, JP H6-046604 A, JP H6-269201 A, and Japanese Utility Model Publication No. H6-044390.

The "weeding device" disclosed in JP H6-046604 A is targeted to "efficiently pulling out grass along with the root, to improve the lifetime of teeth". In order to achieve this objective, a structure is employed in which "a plurality of teeth are provided in a line on a drive shaft and spaced from each other", "adjacent teeth are periodically opened and closed by a slide key", "the tooth in the closed state is driven in a direction to pull out", and "grass is held between teeth that are periodically opened and closed, and the tooth in the closed state is rotated for a while so that the weed can be efficiently pulled out from the root even for the weed of low height". The "weeder in lawn" disclosed in JP H6-269201 A is targeted to "develop a weeder which can pull out and remove, from the root, weeds growing in the lawn without damaging the lawn". In order to achieve this objective, a structure is employed in which "one of a machine frame surrounding in a rectangular shape is extended upwards to form a handle section, a free-moving front wheel and a free-direction, free-moving rear wheel are provided on a front side and a rear side of the machine frame, and two rotational blades which are driven by a motive force from a motor are provided on left and right at an intermediate position of the front and rear wheels", "the rotational blade is supported by a rotational plate and rotational plate supporting arm mounted on a grooved pulley, is held between a rotational blade opening and closing member and a rotational blade supporting member fixed on the shaft, and is slid and rotated", and "the rotational blade opening and closing member causes the two rotational blades on the left and right to function to open or close while the angle is changed according to the rotation, and only the weeds in the lawn are weeded by lowering the rotational blades into the soil". The "weeder" disclosed in Japanese Utility Model Publication No. H6-044390 is targeted to "provide a new means for efficiently removing weeds growing in the lawn with a mechanical means while distinguishing weeds from lawn, in a manner to pick up the weeds". In order to achieve the objective, a structure is employed in which "a rotational member which rotates using a lateral shaft is laterally placed and pivotally supported on a mechanical structure which travels by a travelling wheel, and a comb-like member in which many spike-teeth are placed in a line and with a spacing to allow leaves of the lawn to pass is mounted on a peripheral surface of the rotational member in an inclined state toward the front of the rotational direction of the rotational member and in a manner such that the lined spike-teeth of the comb-like shape pull out the growing weed while combing the leaves of the lawn by the rotation of the rotational member".

The "weeding device" disclosed in JP H6-046604 A is a handy-type weeder, and a motor which operates by a battery is employed for the motive force. The "weeder in lawn" disclosed in JP H6-269201 A is used while being towed by a tractor or the like. The "weeder" disclosed in Japanese Utility Model Publication No. H6-044390 is a machine targeted to be used for occupational activities, as the engine is used for the motive force.

However, with the "weeding device" disclosed in JP H6-046604 A, the weeding operation must be performed while the operator bends his lower back, which becomes a burden to the lower back. In the "weeder in lawn" disclosed in JP H6-269201 A and "weeder" disclosed in Japanese Utility Model Publication No. H6-044390, the structure inside the machine is complex, the maintenance is not simple, and the use of these devices in homes and farms is too luxurious and unsuitable.

Therefore, the Applicant has diligently researched for developing a weeder which can efficiently pull out the weeds growing in the farms and gardens along with the roots, which have simple structures, and which can be easily used in homes. Some results of the research are disclosed in JP 2006-129854 A and JP 2008-086301 A. A "weeder" disclosed in JP 2006-129854 A is targeted to "provide a weeder which pulls out, removes, and mows weeds mixed in a lawn by a clip which moves up and down", and employs a structure in which "pulling out, removing, and mowing of the weeds or the like are enabled by opening and closing movements of the clip which moves up and down, and the structural function of the clip is changed to enable various tasks". A "weeder" disclosed in JP 2008-086301 A is targeted to "provide a weeder which pulls out, removes, and mows weeds mixed in a lawn or the like by a clip which is equipped on a rotation drum", and employs a structure in which "pulling out, removing, and mowing of the weeds or the like are enabled by opening and closing movements of the clip equipped on the rotation drum, and the structural function of the clip is changed to enable various tasks".

RELATED ART REFERENCES

Patent Literature

[Patent Literature 1] JP H06-046604 A
[Patent Literature 2] JP H6-269201 A
[Patent Literature 3] Japanese Utility Model Publication No. H6-044390
[Patent Literature 4] JP 2006-129854 A
[Patent Literature 5] JP 2008-086301 A

DISCLOSURE OF INVENTION

Technical Problem

However, the "weeders" disclosed in JP 2006-129854 A and JP 2008-086301 A are still in the process of research, and are not at the stage for practical use. The Applicant has further researched, and has completed a weeding device for weeds.

Specifically, an advantage of the present invention is provision of a device which can efficiently pull out weeds growing in farms and gardens along with the roots, which has a simple structure, which can be easily used in homes, and which can also be used as a part of a device such as a weeder, a harvester, or the like.

Solution to Problem

In order to achieve the above-described advantage, in a weeding device according to claim 1 of the present application, one comb blade unit is formed by superposing a first comb member in which a plurality of comb blades are provided in a comb shape and in a line on a connecting rod and a second comb member which is formed in the same manner as the first comb member, a comb blade unit rotating member is formed by fixing ends of a plurality of the comb blade units on the same concentric circle of a rotational center of a pair of rotational plates, the connecting rod of the first comb member and/or the second comb member is urged in a longitudinal direction so that one end thereof protrudes from the rotational plate and a protruding piece is formed, with rotation of the comb blade unit rotating member, the protruding piece is pressed by a guide plate positioned at an outer side of the rotational plate and is slid in a direction opposite to the urging direction so that the comb blades provided in line on the first comb member and the second comb member contact or become the closest to each other and hold growing grass, with further rotation of the rotational plate, the held grass is pulled out, and a surface of the guide plate to which the protruding piece contacts is formed in a shape with projections and recesses, and, with the rotation of the comb blade unit rotating member, the comb blades of the first comb member and the second comb member contact or become the closest to each other at an approximate lowermost position and start to separate at an approximate uppermost position.

The "lowermost position" refers to a position which, when the weeding device of the present invention is placed on the ground and used, becomes the closest to the ground, and the "uppermost position" refers to a position rotated from the lowermost position by 180°.

A weeding device according to claim 2 of the present application is the weeding device according to claim 1, wherein both the first comb member and the second come member are movable blades, and are urged in opposite directions in the longitudinal direction so that the protruding pieces protrude in opposite directions of the pair of the rotational plates.

A weeding device according to claim 3 of the present application is the weeding device according to claim 1, wherein one of the first comb member and the second comb member is a fixed blade.

A weeding device according to claim 4 of the present application is the weeding device according to any one of claims 1-3, wherein a rotational shaft of the rotational plate passes loosely through the guide plate, and is connected to a rotating unit at an outer side of the guide plate.

For the rotating unit, for example, a wheel and a crawler belt which rotate by being pressed or towed, a motor which operates by electricity or an engine, etc. may be employed.

A weeding device according to claim 5 of the present application is the weeding device according to any one of claims 1-4, wherein the comb blades of the first comb member and the second comb member extend from a rotational center of the comb blade unit rotating member in a radial direction, tips thereof are bent in a direction perpendicular to the radial direction, and the comb blades at the bent portions contact or become close to each other.

A weeding device according to claim 6 of the present application is the weeding device according to any one of claims 1-5, wherein the guide plate is slidable in a direction of the rotational plate and is also slidable in a rotational direction of the rotational plate, with the sliding in the direction of the rotational plate, a pressing force of the guide plate on the protruding piece can be adjusted, and with the sliding in the rotational direction of the rotational plate, the contact position or the closest position and the separation starting position of the comb blades of the first comb member and the second comb member can be adjusted.

A weeding device according to claim 7 of the present application is the weeding device according to any one of claims 1-6, wherein the comb blade unit is slidable in a direction of the rotational center of the rotational plate, and, with the sliding, a separation distance of the comb blade of the comb blade unit from the ground can be adjusted.

A weeding device according to claim 8 of the present application is the weeding device according to any one of claims 1-7, wherein a non-slip member having a shape of projections and recesses is inscribed on, or a non-slip plate is attached to, the contact or close portions of the comb blades of the first comb member and the second comb member.

A weeding device according to claim 9 of the present application is the weeding device according to any one of claims 1-8, wherein a rotating member covering plate of a band plate shape and having a single edge along a front side in the rotational direction is provided across a periphery of the pair of the rotational plates, and the comb blade of the comb blade unit protrudes from the rotating member covering plate.

A weeding device according to claim 10 of the present application is the weeding device according to any one of claims 1-9, wherein a scraping plate of a comb shape which is inserted between separated comb blades of the first comb member and the second come member is provided on a front side of the comb blade unit rotating member, and a grass storage container in which pulled-out grass is deposited is connected to the scraping plate.

The "front side of the comb blade unit rotating member" refers to a direction of travel when the weeding device of the present invention is used for pulling out grass.

A weeding device according to claim 11 of the present application is the weeding device according to any one of claims 4-10, wherein a handle to be held by a user is connected to a supporting member which supports the rotational shaft of the rotational plate, and the rotating unit is a wheel.

A weeding device according to claim 12 of the present application is the weeding device according to any one of claims 4-10, wherein the rotating unit is a wheel, a rotational shaft of the wheel and the rotational shaft of the rotational plate are separate members, a rotation of the wheel is transmitted to the rotational plate by a drive belt or a gear wheel, and a separation distance of the rotational plate from the ground can be adjusted.

A weeding device according to claim 13 of the present application is the weeding device according to any one of claims 1-12, wherein a rotational ball which is rotatable is embedded on a tip of the protruding piece, and the rotational ball contacts a surface of the guide plate A weeding device according to claim 14 of the present application is the weeding device according to any one of claims 1-13, wherein an outer blade having a blade tip on a front side in the rotational direction is attached on an outside of the comb blade unit rotating member, opposing each comb blade unit, and ends of the outer blade are fixed on the rotational plate and, with the rotation of the comb blade unit rotating member, the outer blade penetrates into the ground.

A weeding device according to claim 15 of the present application is the weeding device according to claim 14, wherein each outer blade is positioned between the comb blade units viewed from a side surface with respect to the rotational direction, the outer blade is detachable with respect to the rotational plate, and a separation distance of the outer blade from the rotational plate can be adjusted.

A weeding device according to claim 16 of the present application is the weeding device according to claim 14 or 15, wherein the outer blade is a single blade or a comb-shaped blade opposing the comb blade of the comb blade unit.

Advantageous Effects of Invention

With the above-described structures, the present invention achieves the following advantageous effects.

(1) In the present invention, because the device comprises a comb blade unit rotating member having a plurality of comb blade units and a pair of rotational plates, a guide plate which presses a protruding piece of the comb blade unit, and a rotating unit which rotates the comb blade unit rotating member, and the comb blades contact or become close to each other with the rotation of the comb blade unit rotating member to hold and pull out grass, no motive force other than the rotating unit is necessary, the structure and arrangement are very simple, and the maintenance is easy, and thus the device can be easily used at homes.

(2) With a structure in which tips of the comb blades of the first comb member and the second comb member are bent in a direction perpendicular to the radial direction so that the comb blades on the bent portions contact or become close to each other, and a no-slip member having a shape with projections and recesses are inscribed or a no-slip plate is attached to the bent portion, the weeds can be efficiently pulled out along with the roots.

(3) With a structure in which the guide plate is configured to be slidable in the direction of the rotational plate and slidable in the rotational direction of the rotational plate, or a structure in which the comb blade unit is configured to be slidable in the direction of the rotational center of the rotational plate, the weeds can be pulled out at an optimum state corresponding to the type and the manner of growth of the weeds.

(4) With a structure in which a rotating member covering plate having a single edge is provided across the comb blade unit rotating member, the grass can be pulled out and mowed at the same time without the pulled-out grass being entangled around the comb blade unit rotating member.

(5) With a structure in which a scraping plate and a grass storage are provided on the front side of the comb blade unit rotating member, because the pulled-out grass is automatically deposited in the grass storage, the cleaning up of the pulled-out grass is facilitated.

(6) With a structure in which a handle is connected to the guide plate and a wheel is employed as the rotating unit, not only can the present invention be used as the weeding device, but also, the electric power or engine as the motive force becomes not necessary because the wheel is used as the rotating unit.

(7) In a structure in which a rotational ball which is rotatable and which is embedded on a tip of the protruding piece contacts a surface of the guide plate, a frictional resistance between the tip of the protruding piece and the surface of the guide plate can be reduced, and wearing of these members can be prevented.

(8) In a structure in which an outer blade is attached on an outer side of the comb blade unit rotating member, because the outer blade is penetrated into the ground and digs the soil, the grass can be easily pulled out.

BEST MODE FOR CARRYING OUT THE INVENTION

Figure 1:
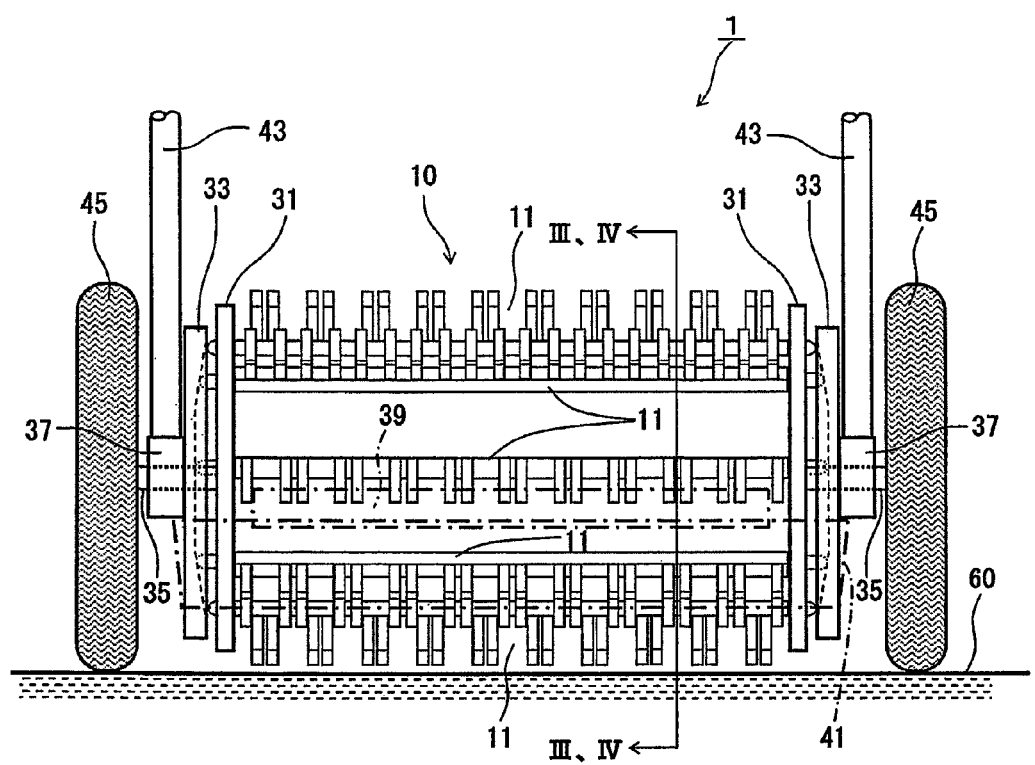
FIG. 1 is a front view of a weeding device according to a first preferred embodiment of the present invention.

First through fourth preferred embodiments of the present invention will now be described with reference to FIGS. 1-10.

In FIGS. 1-10, reference numeral 1 represents a weeding device according to a first preferred embodiment of the present invention, reference numeral 2 represents a weeding device according to a second preferred embodiment of the present invention, reference numeral 3 represents a weeding device according to a third preferred embodiment of the present invention, reference numeral 4 represents a weeding device according to a fourth preferred embodiment of the present invention, reference numeral 10 represents a comb blade unit rotating member, reference numeral 11 represents a comb blade unit, reference numeral 13a represents a first comb member, reference numeral 13b represents a second comb member, reference numeral 15 represents a connecting rod, reference numeral 17 represents a comb blade, reference numeral 19 represents a no-slip member, reference numeral 21 represents a protruding piece, reference numeral 211 represents a rotational ball, reference numeral 23 represents a spring, reference numeral 25 represents a fitting groove, reference numeral 27 represents a connecting rod cover, reference numeral 31 represents a rotational plate, reference numeral 33 represents a guide plate, reference numeral 35 represents a rotational shaft, reference numeral 351 represents a rotational shaft of the comb blade unit rotating member, reference numeral 352 represents a pulley of the comb blade unit rotating member, reference numeral 353 represents a rotational shaft of a wheel, reference numeral 354 represents a pulley of the wheel, reference numeral 355 represents a drive belt, reference numeral 37 represents a supporting member, reference numeral 39 represents a scraping plate, reference numeral 391 represents a scraping plate body, reference numeral 393 represents a scraping piece, reference numeral 41 represents a grass storage, reference numeral 43 represents a handle, reference numeral 45 represents the wheel, reference numeral 46 represents an auxiliary wheel, reference numeral 47 represents a rotating member covering plate, reference numeral 49 represents a housing, reference numeral 51 represents an outer blade, and reference numeral 60 represents the ground.

Figure 2:
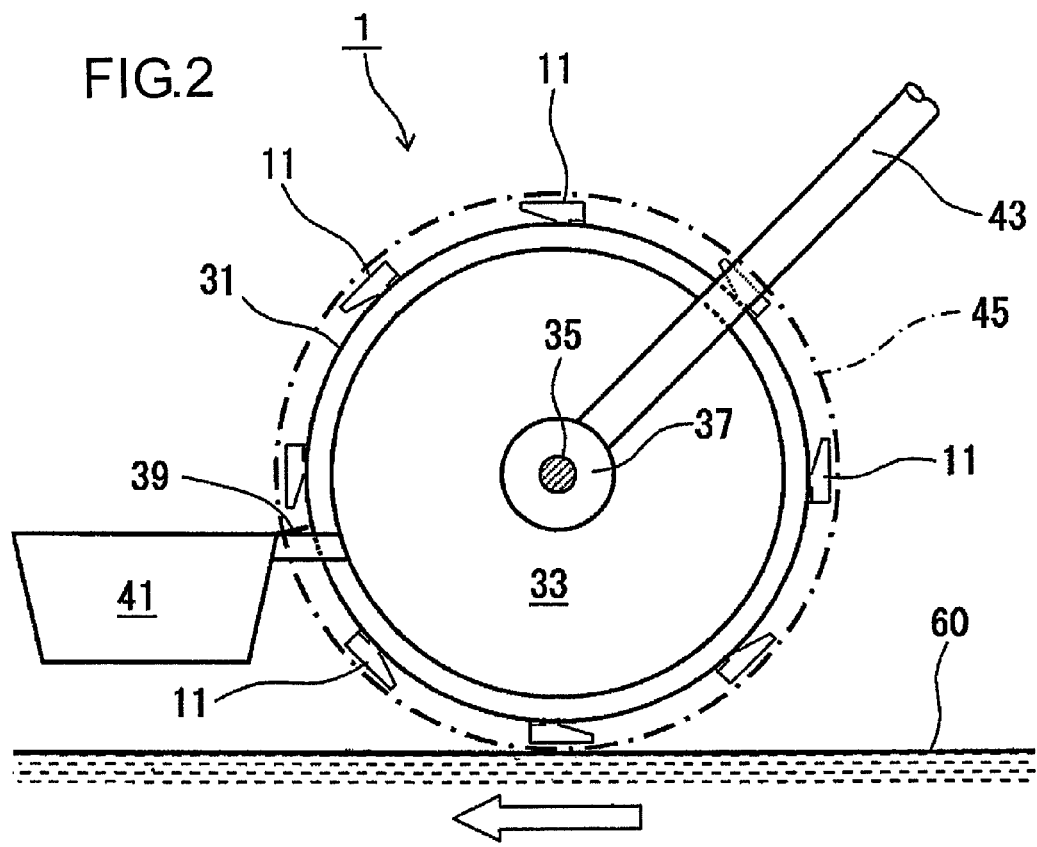
FIG. 2 is a side view of the weeding device according to the first preferred embodiment of the present invention.
Figure 7:
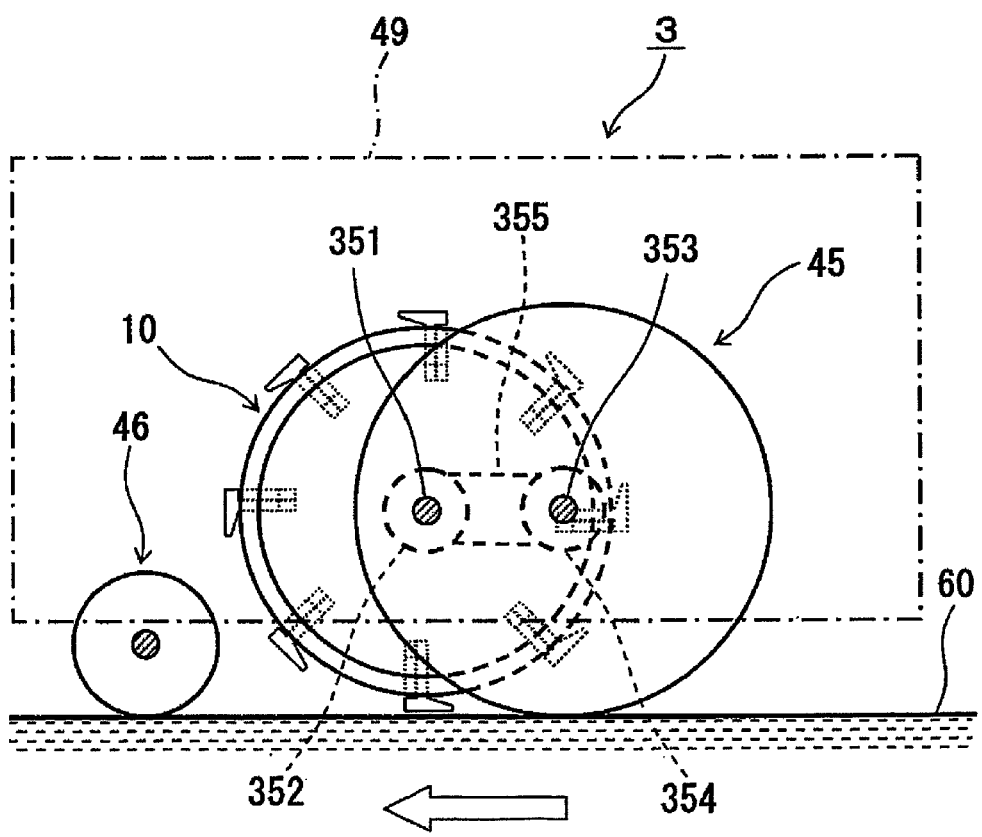
FIG. 7 is a side view of a weeding device according to a third preferred embodiment of the present invention.

A scraping plate 39 and a grass storage container 41 are shown with a dot-and-chain line in FIG. 1, a wheel 45 is shown with a dot-and-chain line in FIG. 2, and a housing 49 is shown with a dot-and-chain line in FIG. 7. In the embodiments other than the third preferred embodiment, a rotational shaft 351 of a comb blade unit rotating member and a rotational shaft 353 of the wheel coincide with each other, and thus, in these configurations, the rotational shaft of the comb blade unit rotating member and the rotational shaft of the wheel are collectively referred to as a rotational shaft 35.

First Preferred Embodiment

First, a weeding device 1 according to the first preferred embodiment of the present invention will be described with reference to FIGS. 1-3, 5, and 6.

The weeding device 1 primarily comprises a circular cylindrical comb blade unit rotating member 10, a pair of guide plates 33 having the same central axis as the comb blade unit rotating member 10 and positioned on both outer sides thereof, a pair of supporting members 37 positioned on an outer side, a pair of wheels 45 positioned on a further outer side, a handle 43 fixed on the supporting member 37, and a scraping plate 39 and a grass storage container 41 placed on a front surface of the comb blade unit rotating member 10.

The comb blade unit rotating member 10 comprises a pair of rotational plates 31, 31, and a plurality of comb blade units 11, 11, . . . provided in an approximate equal spacing and across a region between the rotational plates 31, 31 on the same circle centered at a center of the rotational plate 31 viewed from the side.

The comb blade unit 11 comprises a first comb member 13a, a second comb member 13b, and a connecting rod cover 27 surrounding connecting rods 15, 15 of the first comb member 13a and the second comb member 13b which are superposed. In the first comb member 13a, a plurality of comb blades 17, 17, . . . are provided in a line and in a comb shape on the connecting rod 15 having a rectangular cross section. The comb blade 17 extends in a direction perpendicular to a longitudinal direction of the connecting rod 15, and further in a direction perpendicular to the direction of extension. The second comb member 13b is configured similarly to the first comb member 13a, and the tips of the comb blades 17 of the second comb member 13b and of the first come member 13a are configured to be overlapped when viewed from the side. The first comb member 13a and the second comb member 13b are slidably fitted to the connecting rod cover 27 via a fitting groove 25 inscribed on the comb blade 17.

One end of the first comb member 13a of the comb blade unit 11 and one end of the second comb member 13b of the comb blade unit 11 are urged in opposite directions from each other by a spring 23, and the other end of the first comb member 13a and the other end of the second comb member 13b protrude from the connecting rod cover 27 and the rotational plate 31, to form protruding pieces 21. The protruding pieces 21 are pressed such that the comb blades 17, 17 of the first comb member 13a and the second comb member 13b become close to each other or the tip portions of the comb blades 17, 17 contact each other. A no-slip member 19 is formed on the tip portions where the comb blades 17, 17 become close to or contact each other. The no-slip member 19 may be in a form in which a shape of projections and recesses is inscribed on the comb blade 17 itself, a form in which a no-slip plate having a high coefficient of friction such as silicon rubber is attached, or a form in which the comb blade 17 itself is covered with silicon rubber or low resilience rubber or the like having a superior shock absorption characteristic.

Figure 5:
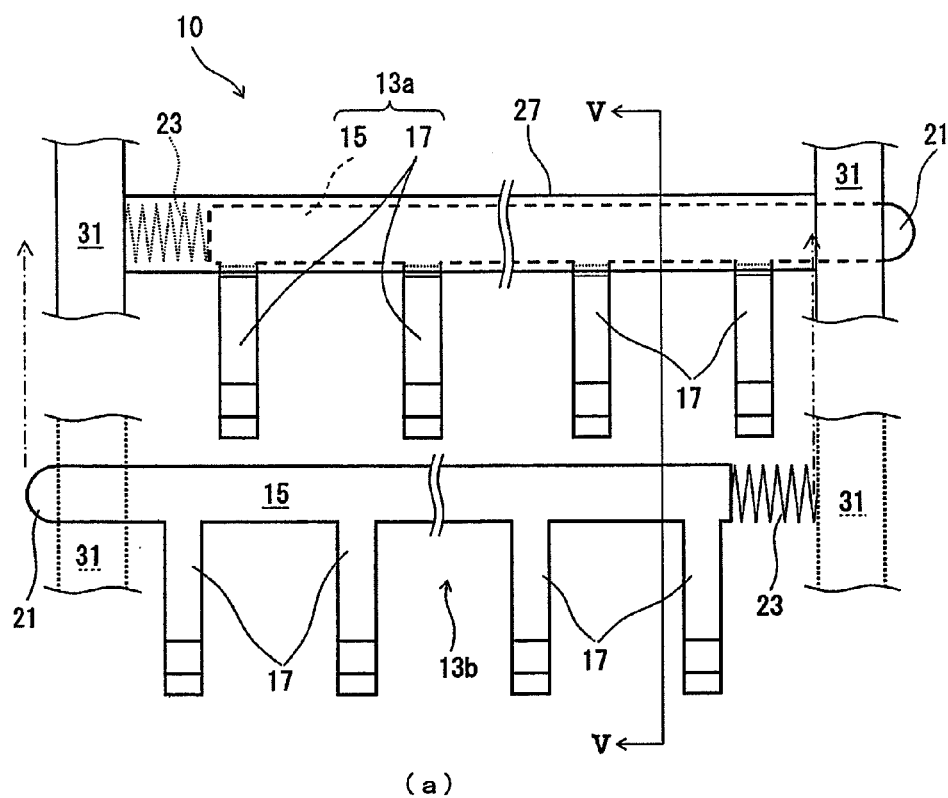
FIG. 5 is a structural diagram of a comb blade unit rotating member of weeding devices according to the first and second preferred embodiments, wherein (a) is a front view and (b) is a cross sectional diagram along an arrow V-V.
Figure 5:
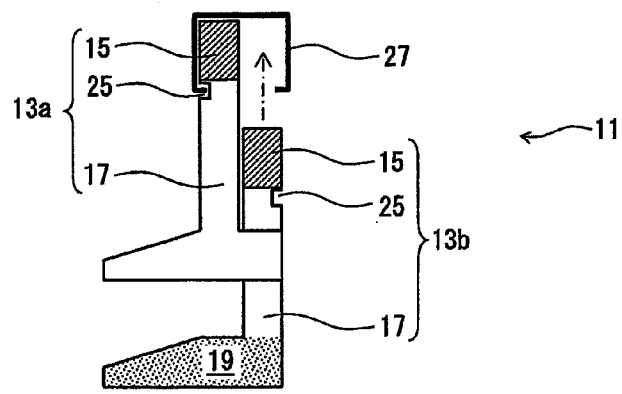

In the embodiments, a movable blade which slides in the left and right directions in FIG. 5 is employed for each of the first comb member 13a and the second comb member 13b, but alternatively, a fixed blade which does not slide in the left and right directions may be employed in one of the first comb member 13a and the second comb member 13b.

In addition, each comb blade unit 11 is detachably fixed on the rotational plate 31, and can also be slid in a direction around the rotational center of the rotational plate 31 and fixed.

On both ends of the circular cylindrical comb blade unit rotating member 10, the guide plate 33 having a disc shape, the supporting member 37, and the wheel 45 are connected in this order along the rotational shaft of the comb blade unit rotating member 10.

The guide plate 33 is configured such that the guide plate 33 does not rotate even when the comb blade unit rotating member 10 is rotated, and with the rotation of the comb blade unit rotating member 10, the protruding piece 21 protruding from the rotational plate 31 moves in contact with and in a manner to sweep a surface of the guide plate 33. The surface of the guide plate 33 to which the protruding piece 21 contacts has a wavy shape with projections and recesses. In the portion of the "recess", the pressing force on the protruding piece 21 is weakened, and the comb blades 17, 17 of the first comb member 13a and the second comb member 13b are separated from each other, and in the portion of the "projection", the pressing force on the protruding piece 21 is strengthened, and the comb blades 17, 17 of the first comb member 13a and the second comb member 13b become close to or contact each other. The projections and recesses on the surface of the guide plate 33 may be formed by changing the thickness of the guide plate 33 itself or by bending and machining the guide plate 33 in the shape of the projections and recesses.

The supporting member 37 positioned at an outer side of the guide plate 33 rotatably supports a rotational shaft 35 connecting the wheel 45 and the comb blade unit rotating member 10, and with the supporting member 37, the rotation of the wheel 45 is transmitted to the comb blade unit rotating member 10. In addition, the guide plate 33 is supported on the supporting member 37, and the guide plate 33 is slidable with respect to the supporting member 37 in a direction of the rotational plate 31 and also is rotatable at a predetermined angle. That is, the guide plate 33 is slidable in the rotational direction of the rotational plate 31.

The handle 43 is fixed on the supporting member 37 in a direction perpendicular to the rotational shaft 35, and the grass storage container 41 is supported from the supporting member 37 in front of the comb blade unit rotating member 10 such that the grass storage container 41 is positioned in a direction parallel to the rotational shaft 35.

The handle 43 is a hollow, round bar, and extends from the supporting member 37 diagonally upward and behind the comb blade unit rotating member 10, and the tips of the handles 43 are connected to each other to form a holding section (not shown) for a user.

Figure 6:
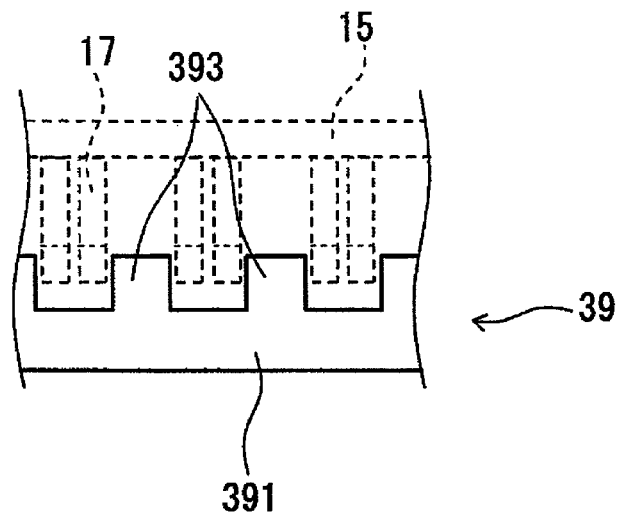
FIG. 6 is a plan view of a scraping plate.

The grass storage container 41 is a container having an opened upper portion, and a plate-shaped scraping plate 39 is fixed on an upper side of the grass storage container 41 on the side of the comb blade unit rotating member 10, toward the comb blade unit rotating member 10. As shown in FIG. 6, the scraping plate 39 comprises a scraping plate body 391 and a plurality of scraping pieces 393, 393, . . . , and the scraping piece 393 is configured to be inserted between separated comb blades 17, 17 of the first comb member 13a and the second comb member 13b.

The operation of the weeding device 1 will now be described.

Figure 3:
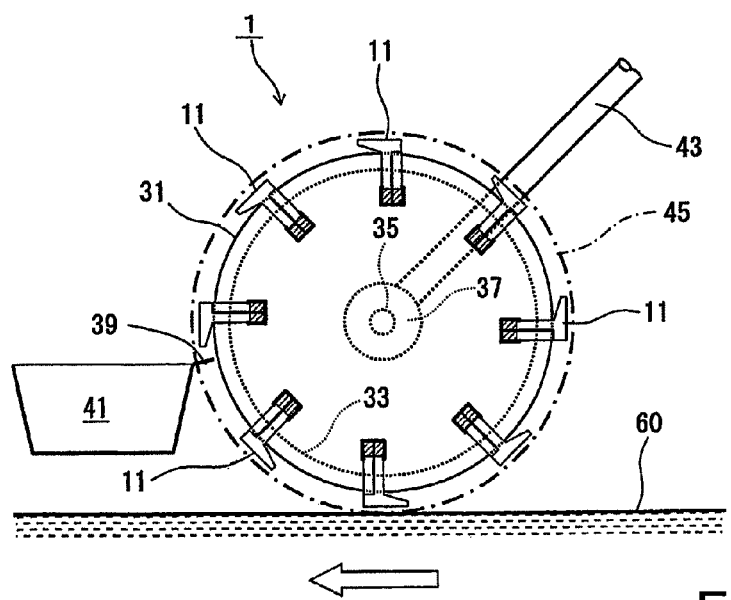
FIG. 3 is a cross sectional diagram along an arrow III-III in FIG. 1 showing the first preferred embodiment of the present invention.

The weeding device 1 is configured such that the grass can be pulled out by moving the weeding device 1 in a direction of an arrow in FIGS. 2 and 3. Thus, during use, a user uses the weeding device 1 by holding a holding section (not shown) of the handle 43 and pushing the weeding device 1.

When the weeding device 1 moves forward in the direction of the arrow, the wheel 45 rotates, the rotation is directly transmitted through the rotational shaft 35 to the comb blade unit rotating member 10, and the comb blade unit rotating member 10 rotates. With the rotation of the comb blade unit rotating member 10, the comb blades 17, 17 of the first comb member 13a and the second comb member 13b of the comb blade unit 11 become close to or contact each other, and then separate from each other, and these states are repeated. More specifically, with reference to FIGS. 2 and 3, when the weeding device 1 moves in the direction of the arrow (to the left), the wheel 45 rotates counterclockwise (left rotation), and the comb blades 17, 17 become the closest to or contact each other at a position of "6 o'clock" where the comb blade 17 becomes the closest to the ground 60, start to be separated at a position of "12 o'clock", and become the farthest away from each other at a position of "9 o'clock" where the scraping piece 393 is protruded in a comb-like shape.

With this configuration, the comb blades 17, 17 hold the grass at the position of "6 o'clock", and pull out and hold the grass at positions from "6 o'clock" to "4 o'clock", the held state is released from the position of "12 o'clock", and the pulled-out grass is released by an interaction with the scraping piece 393 at the position of "9 o'clock". The released grass is moved on the scraping plate body 391 and deposited in the grass storage container 41.

As described before, because each comb blade unit 11 can be slid in the direction of the rotational center of the rotational plate 31 and fixed, a separation distance between the comb blade 17 and the ground 60 at the position of "6 o'clock" can be adjusted, and with the sliding of the guide plate 33 in the direction of the rotational plate 31, the pressing force of the guide plate 33 on the protruding piece 21 of the comb blade unit 11 can be adjusted, so that a holding force suited for the type of grass can be achieved. In addition, the guide plate 33 can be rotated so that the position where the comb blade 17 becomes the closest to the ground 60 (the position of "6 o'clock") can be adjusted.

Figure 10:
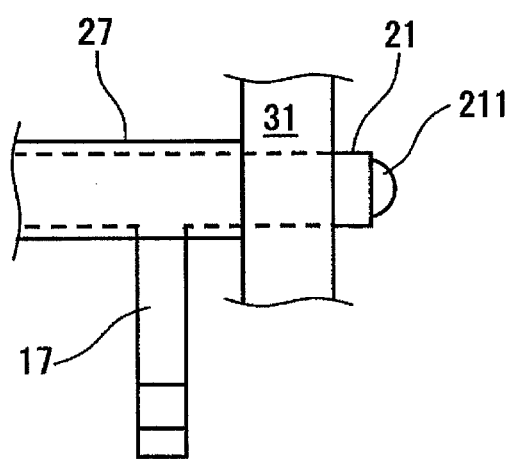
FIG. 10 is a detailed diagram of preferred configurations of a tip of a protruding piece of a comb blade unit other than the first through fourth preferred embodiments of the present invention.

Alternatively, as shown in FIG. 10, a configuration may be employed in which a rotational ball 211 which is rotatable is embedded in the tip of the protruding piece 21 so that the comb blades 17, 17 of the first comb member 13a and the second comb member 13b become close to or contact each other while the rotational ball 211 contacts the surface of the guide plate 33 and rotates. With such a configuration, the frictional force between the tip of the protruding piece 21 and the guide plate 33 can be reduced. This configuration is not limited to the first preferred embodiment, and may similarly be applied in the second through fourth preferred embodiments described below.

Second Embodiment

Next, a weeding device 2 of the second preferred embodiment of the present invention will be described. The weeding device 2 is similar in structure and operation to the weeding device 1, and only differs in that a rotating member covering plate 47 is added as a constituent element to the comb blade unit rotating member 10 of the weeding device 1. Thus, the added constituent element and the operation and effect thereof will be described.

Figure 4:
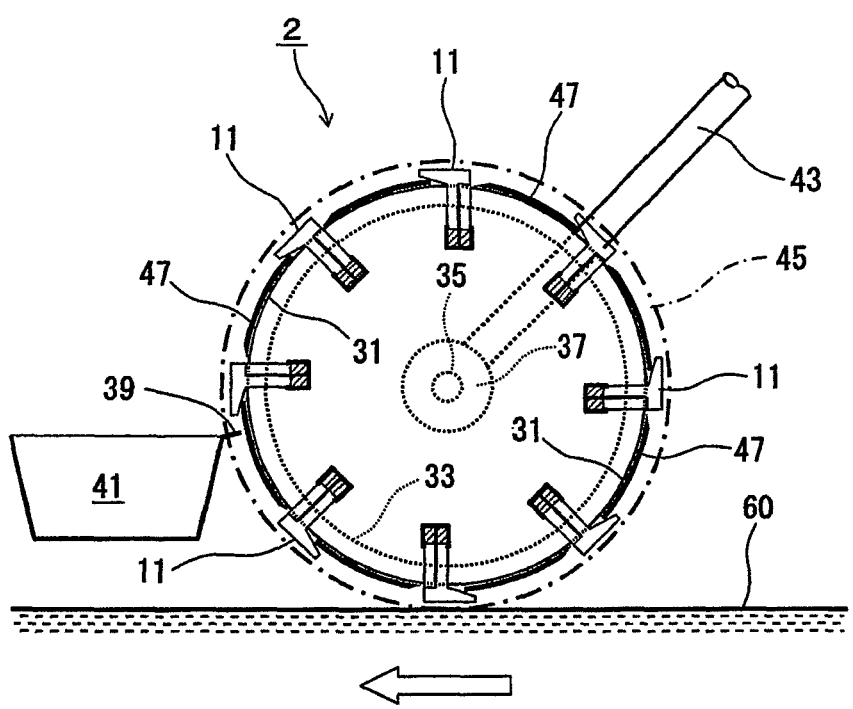
FIG. 4 is a cross sectional diagram along an arrow IV-IV in FIG. 1 showing a second preferred embodiment of the present invention.

As shown in FIG. 4, in the comb blade unit rotating member 10 of the weeding device 2, the rotating member covering plate 47 having a band plate shape, that is, a rectangular shape viewed in plan view, is provided across the periphery of the pair of the rotational plates 31, 31, and the tip of the comb blade 17 of the comb blade unit 11 protrudes from the rotating member covering plate 47. A blade is formed in front in the rotational direction of the rotating member covering plate 47 along the rotational shaft of the comb blade unit rotating member 10.

With the above-described structure, with the rotation of the wheel 45, the comb blade unit rotating member 10 of the weeding device 2 holds the grass between the comb blades 17, 17, pulls out the grass, deposits the pulled-out grass in the grass storage container 41, and can cut the growing grass with the rotating structure covering plate 47 at the position of "6 o'clock" where the comb blade 17 becomes the closest to the ground 60. In addition, because of the rotating member covering plate 47, the cut grass and the pulled-out grass do not become entangled on the comb blade unit rotating member 10.

In the first preferred embodiment and the second preferred embodiment, the weeding device itself of the present invention is used as the weeding tool, but alternatively, the weeding device may be used as a part of a weeder and in a towed state, or as a part of a harvester. In addition, as the rotating unit for applying rotation to the comb blade unit rotating member 10, various configurations may be employed such as pushing with human power as described in the embodiments, applying rotation to the rotational shaft 35 through a wheel and by towing the device with a machine or the like, and applying rotation to the rotational shaft 35 by a motive force using an electric motor, an engine, or the like. This similarly applies to the third and fourth preferred embodiments described below.

Third Embodiment

Next, a weeding device 3 of the third preferred embodiment of the present invention will be described with reference primarily to FIG. 7. While the rotational shaft of the comb blade unit rotating member 10 and the rotational shaft of the wheel 45 are the same shaft in the weeding devices 1 and 2, the weeding device 3 differs from these configurations in that separate rotational shafts are employed for these rotational shafts. Thus, for the weeding device 3, a difference from the weeding devices 1 and 2 will primarily be described.

The weeding device 3 primarily comprises a circular cylindrical comb blade unit rotating member 10, a pair of guide plates 33 (not shown in FIG. 7) having the same central axis as the comb blade unit rotating member 10 and positioned on both outer sides, a pair of supporting members 37 (not shown in FIG. 7) positioned at an outer side, a pair of wheels 45, a pair of auxiliary wheels 46 positioned on a front side in the direction of travel of the wheel 45, and a housing 49 covering these elements.

The rotational shaft 351 of the comb blade unit rotating member, the rotational shaft 353 of the wheel, and the rotational shaft of the auxiliary wheel 46 are all rotatably supported in the housing 49, and the rotational shaft 351 of the comb blade unit rotating member is configured to be slidable with respect to the housing 49 in the up and down direction perpendicular to the direction of travel as shown by an arrow.

A pulley 352 of the comb blade unit rotating member is fixed on the rotational shaft 351 of the comb blade unit rotating member, a pulley 354 of the wheel is fixed on the rotational shaft 353 of the wheel, and a drive belt 355 is wound around the pulley 352 of the comb blade unit rotating member and the pulley 354 of the wheel, so that the rotation of the wheel 45 is transmitted through the drive belt 355 to the comb blade unit rotating member 10. The rotational direction of the wheel 45 and the rotational direction of the comb blade unit rotating member 10 coincide with each other, and in the embodiment, a rotational speed of the wheel 45 and the rotational speed of the comb blade unit rotating member 10 are in a ratio of 1:1.

The ratio of the rotational speed of the wheel 45 and the rotational speed of the comb blade unit rotating member 10 can be set to 1:n (n>1). In addition, the rotation of the comb blade unit rotating member 10 and the rotation of the wheel 45 do not need to be linked with each other, and the rotation of the comb blade unit rotating member 10 and the rotation of the wheel 45 may be set independent from each other.

The structure of the comb blade unit rotating member 10 and the interrelation among the comb blade unit rotating member 10, the guide plate 33, and the supporting member 37 have already been described in the first preferred embodiment, and will not be described again.

Fourth Embodiment

Figure 8:
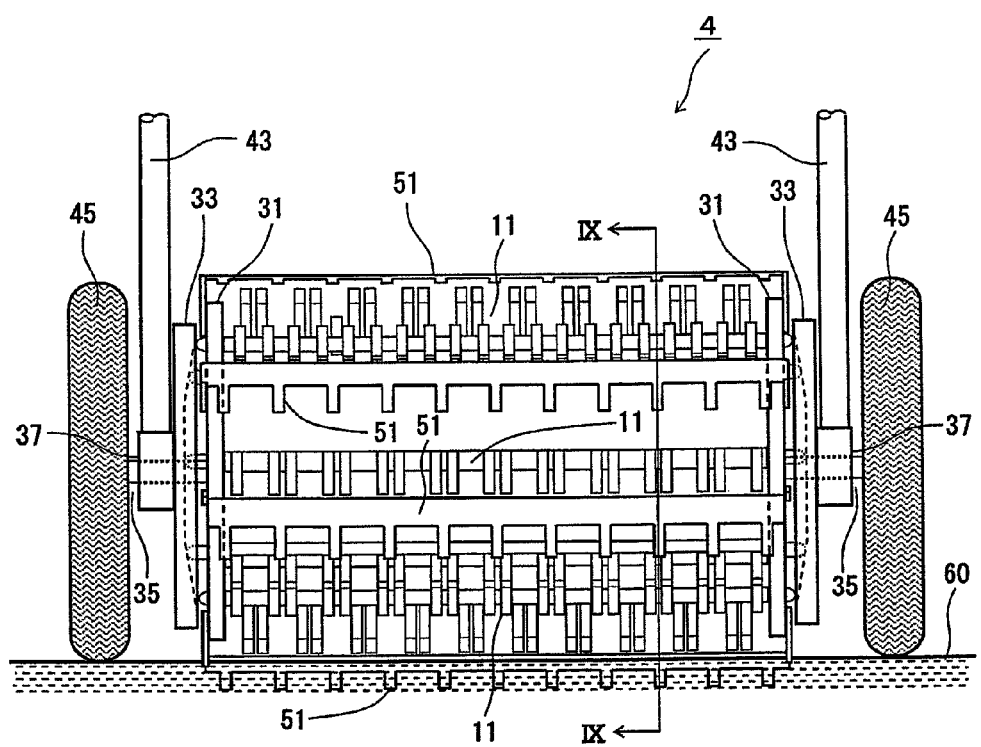
FIG. 8 is a front view of a weeding device according to a fourth preferred embodiment of the present invention.
Figure 9:
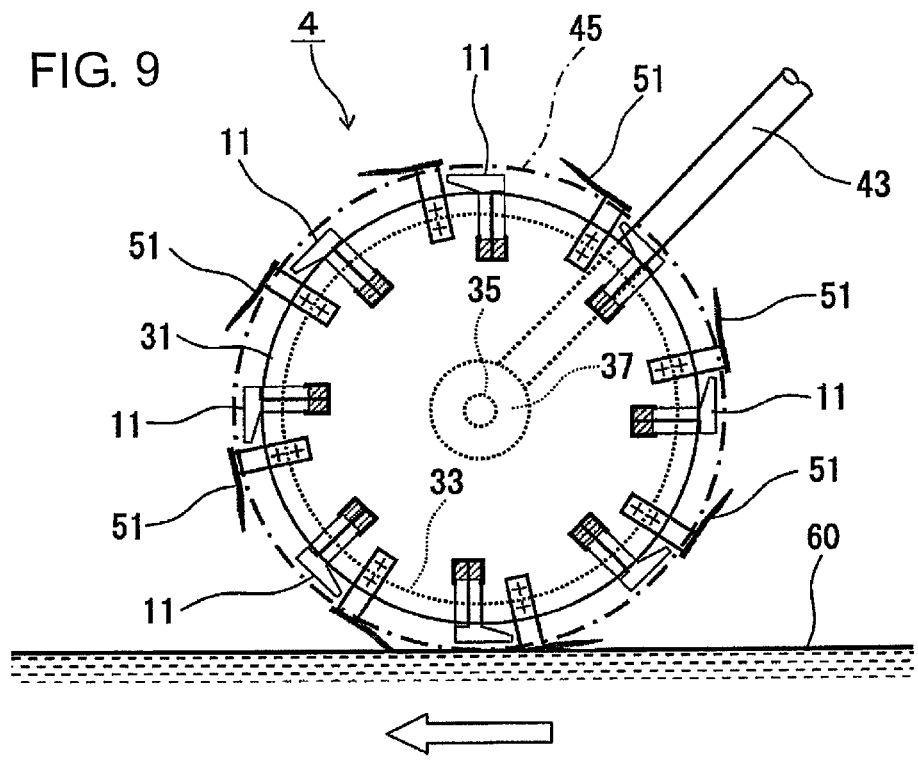
FIG. 9 is a cross sectional diagram along an arrow IX-IX of FIG. 8 showing the fourth preferred embodiment of the present invention.

Next, a weeding device 4 according to the fourth preferred embodiment of the present invention will be described based primarily on FIGS. 8 and 9. The weeding device 4 has a structure approximately the same as the weeding device 1, and differs from the weeding device 1 in that an outer blade 51 is added to the comb blade unit rotating member 10 of the weeding device 1. Thus, the added constituent element and the operation and effect thereof will be described.

The outer blade 51 is attached to oppose each of the comb blade units 11 along an outer periphery of the comb blade unit rotating member 10. In a view from a side with respect to the rotational direction of the comb blade unit rotating member 10, each outer blade 51 is positioned between comb blade units 11, 11, has a blade tip in front in the rotational direction, and is a comb-like blade to be positioned between comb blades of the comb blade unit 11. In addition, the ends of the outer blade 51 are bent in a right angle, and the bent portion is attached so as to be detachable with respect to the rotational plate 31 and such that a separation distance with respect to the rotational plate 31 can be adjusted.

With the rotation of the comb blade unit rotating member 10, the outer blade 51 rotates, and penetrates into the ground 60. With the penetration of the outer blade 51 into the ground 60, the ground 60 is dug, and the grass existing between the grooves which are dug are held and pulled out by the comb blade unit 11. In addition, because the separation distance of the outer blade 51 with respect to the rotational plate 31 is adjustable, the penetration depth into the ground 60 can be adjusted according to the state of the soil or the like.

The outer blade 51 in the embodiment has a comb-like shape. Although the penetration force into the ground 60 is increased with the comb-like shape, alternatively, a single blade structure may be employed as the outer blade 51 in place of the comb-like shape. Alternatively, the shape and angle of the blade tip of the outer blade 51 may be changed.

EXPLANATION OF REFERENCE NUMERALS

1 WEEDING DEVICE ACCORDING TO FIRST PREFERRED EMBODIMENT
2 WEEDING DEVICE ACCORDING TO SECOND PREFERRED EMBODIMENT
3 WEEDING DEVICE ACCORDING TO THIRD PREFERRED EMBODIMENT
4 WEEDING DEVICE ACCORDING TO FOURTH PREFERRED EMBODIMENT
10 COMB BLADE UNIT ROTATING MEMBER
11 COMB BLADE UNIT
13a FIRST COMB MEMBER
13b SECOND COMB MEMBER
15 CONNECTING ROD
17 COMB BLADE
19 NO-SLIP MEMBER
21 PROTRUDING PIECE
211 ROTATIONAL BALL
31 ROTATIONAL PLATE
35 GUIDE PLATE
351 ROTATIONAL SHAFT OF COMB BLADE UNIT ROTATING MEMBER
353 ROTATIONAL SHAFT OF WHEEL
355 DRIVE BELT
37 SUPPORTING MEMBER
39 SCRAPING PLATE
41 GRASS STORAGE CONTAINER
43 HANDLE
45 WHEEL
47 ROTATING MEMBER COVERING PLATE
51 OUTER BLADE
60 GROUND

The invention claimed is:

1. A weeding device, comprising:
a plurality of comb blade members in each of which a first comb member and a second comb member, in each of which a plurality of comb blades are provided in a comb shape and in a line on a connecting rod, are combined, wherein the plurality of comb blades are stationary with respect to the connecting rod;
a comb blade member rotating member including a pair of rotational plates holding both ends of the connecting rods of the first comb member and the second comb member, included in each of the plurality of comb blade members, such that the ends of the connecting rods are movable in a longitudinal direction of the connecting rod; and
a guide plate which is stationary with respect to the comb blade member rotating member; wherein
the connecting rod of the first comb member and/or the second comb member is urged in the longitudinal direction at an end thereof so that a protruding piece is formed on one end thereof so that the protruding piece passes through the rotational plate and protrudes towards the guide plate;
a surface of the guide plate to which the protruding piece contacts is formed in a shape with projections and recesses, and with rotation of the rotational plate, the protruding piece is pressed by the guide plate and the connecting rod of the first comb member and/or the second comb member is slid in a direction opposite to the urging direction so that the comb blades provided in line on the first comb member and the second comb member contact or become the closest to each other and hold growing grass with further rotation of the rotational plate, the held grass is pulled out; and
with further rotation of the rotational plate, the pressing of the protruding piece by the guide plate is released and the connecting rod of the first comb member and/or the second comb member is slid in the urging direction so that the blades of the first comb member and the second comb member separate from each other.

2. The weeding device according to claim 1, wherein both the first comb member and the second comb member are movable blades, and are urged in opposite direction in the longitudinal direction so that the protruding pieces protrude in opposite directions of the pair of the rotational plates.

3. The weeding device according to claim 1, wherein one of the first comb member and the second comb member is a fixed blade.

4. The weeding device according to claim 1, wherein
a rotational shaft of the rotational plate passes loosely through the guide plate, and is connected to a rotating unit at an outer side of the guide plate.

5. The weeding device according to claim 1, wherein
the comb blades of the first comb member and the second comb member extend from a rotational center of the comb blade member rotating member in a radial direction, tips thereof are bent in a direction perpendicular to the radial direction, and the comb blades at the bent portions contact or become close to each other.

6. The weeding device according to claim 1, wherein
the guide plate is slidable in a direction of the rotational plate and is also slidable in a rotational direction of the rotational plate;
with the sliding in the direction of the rotational plate, a pressing force of the guide plate on the protruding piece can be adjusted, and
with the sliding in the rotational direction of the rotational plate, the contact position or the closest position and the separation starting position of the comb blades of the first comb member and the second comb member can be adjusted.

7. The weeding device according to claim 1, wherein
the comb blade member is slidable in a direction of the rotational center of the rotational plate, and with the sliding, a separation distance of the comb blade of the comb blade member from the ground can be adjusted.

8. The weeding device according to claim 1, wherein
a no-slip member having a shape of projections and recesses is inscribed on, or a no-slip plate is attached to, the contact or close portions of the comb blades of the first comb member and the second comb member.

9. The weeding device according to claim 1, wherein
a rotating member covering plate of a band plate shape and having a single edge along a front side in the rotational direction is provided across a periphery of the pair of the rotational plates, and
the comb blades of the comb blade member protrude from the rotating member covering plate.

10. The weeding device according to claim 1, wherein
a scraping plate of a comb shape which is inserted between separated comb blades of the first comb member and the second comb member is placed on the comb blade member rotating member, and
a grass storage container in which pulled-out grass is deposited is connected to the scraping plate.

11. The weeding device according to claim 4, wherein
a handle to be held by a user is connected to a supporting member which supports the rotational shaft of the rotational plate, and
the rotating unit is a wheel coaxial to the rotational shaft of the rotational plate.

* * * * *